Jan. 5, 1960 I. C. MINOTT, JR 2,919,866

TAPE DRIVE SYSTEM AND CARTRIDGE THEREFOR

Filed March 4, 1954

INVENTOR:
IVAN C. MINOTT, JR.
BY
Curtis, Morris & Safford.
ATTORNEYS:

United States Patent Office 2,919,866

Patented Jan. 5, 1960

2,919,866

TAPE DRIVE SYSTEM AND CARTRIDGE THEREFOR

Ivan C. Minott, Jr., Elmont, N.Y.

Application March 4, 1954, Serial No. 414,215

4 Claims. (Cl. 242—55.11)

This invention relates to sound recording and reproducing apparatus and more particularly to apparatus utilizing a long-tape-type of sound carrier housed in a cartridge.

Among the advantages of the described embodiment of the present invention is the provision of a simplified compact sound transducing apparatus with a tape-type sound carrier in which at least two complete sound tracks extending the full length of the tape sound carrier may be used and wherein the usual "rewind" operation is eliminated.

Another advantage of the apparatus described is the provision of a simple, rugged and inexpensive cartridge containing the tape-type sound carrier and a machine adapted to handle the cartridge with a minimum of supervision or control by the user. The cartridge is placed into operative relationship with a sound transducing machine merely by resting the cartridge on the top of the machine and pressing it down into place. The need for threading the tape through any complicated tape-feeding mechanism is eliminated. This single motion of pressing the cartridge down onto the machine accomplishes all of the functions of seating the cartridge in place, placing the tape sound carrier adjacent the sound transducing head, and applying suitable pressure to the reverse side of the tape to hold it into firm engagement with the sound head and to tension the tape for proper reeling within the cartridge.

A further advantage of the present invention is that its simplicity of operation makes it well adapted for use by persons unskilled in the art of sound recording and reproducing equipment.

Still another advantage of the apparatus described is that the cartridge may be inverted in order to use other sound tracks and in order to use sound tracks running in opposite directions, thus providing a relatively great length of recording in a single cartridge. The cartridge has no projecting elements and is well adapted for storage in libraries and for sending through the mails. This apparatus is particularly well adapted for the reproduction of entertainment material in the home, for example, such as music, stories and plays.

A still further advantage of the apparatus described is the fact that a single drive element is enabled to be used both as the drive element to move the tape sound carrier at constant speed past the sound head and to be used as the drive element to turn the take-up reel. Moreover, a smooth accurate reeling operation is obtained so that the tape sound carrier is wound uniformly and under slight uniform tension in the take-up roll.

Various other objects, aspects, and advantages of my invention will be in part pointed out and in part apparent from the following description of an embodiment of my invention considered in conjunction with the accompanying drawings, in which.

Figure 1:
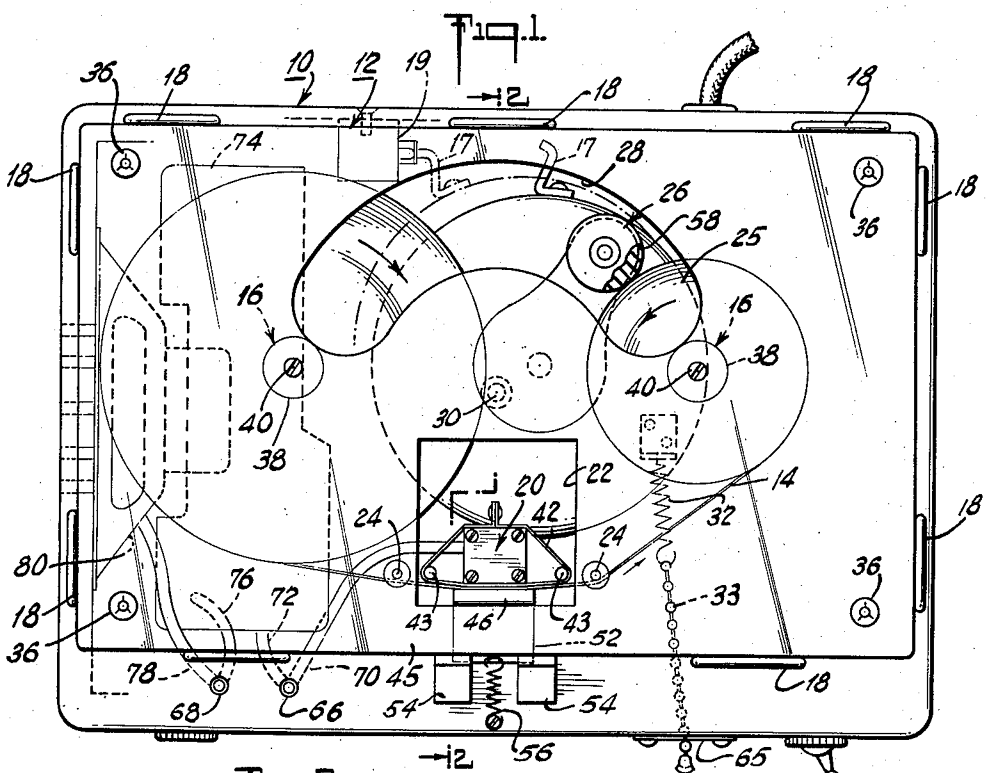
Figure 1 is a top view of a sound reproducing machine with a cartridge having a tape-type sound carrier housed therein and shown resting in its operating position on top of the machine.

Referring to the drawings in greater detail, a sound reproducing machine 10 is shown adapted to use a generally rectangular cartridge 12 which houses a long tape-type magnetizable sound carrier 14 wound on two spools 16. During sound reproduction the tape 14 may be reeled in either direction from either one to the other of the spools 16. In operation, the cartridge is seated down on top of the machine inside of a number of elevated resilient cartridge holding elements 18 spaced in a generally rectangular pattern so as to fit snugly against the lower outside edge of the cartridge to hold it firmly in place. A sound head 20 projecting up from the machine extends into the cartridge through a window 22 in scanning relationship with the tape 14, which is guided past this window by a pair of guiding rods 24 mounted in the cartridge adjacent the window. The tape 14 is reeled from left to right past sound head 20, as seen in Figure 1, and is wound in a take-up roll 25 on the right spool 16 by means of a tape-driving capstan 26 which also projects up from the machine through another arcuate window 28 in the cartridge and frictionally engages the outside layer of the tape being wound onto the roll 25. This capstan is movably mounted in machine 10 to swing in an arc about a pivot shaft 30 toward and away from the right spool 16, and thus accommodates the increasing diameter of roll 25 as the tape is continuously wound thereon. A bias spring 32 and adjustable control 33 serves to hold capstan 26 firmly against the outside of roll 25 to provide a firm steady driving action as explained in detail hereinafter.

Figures 2, 3, 4:
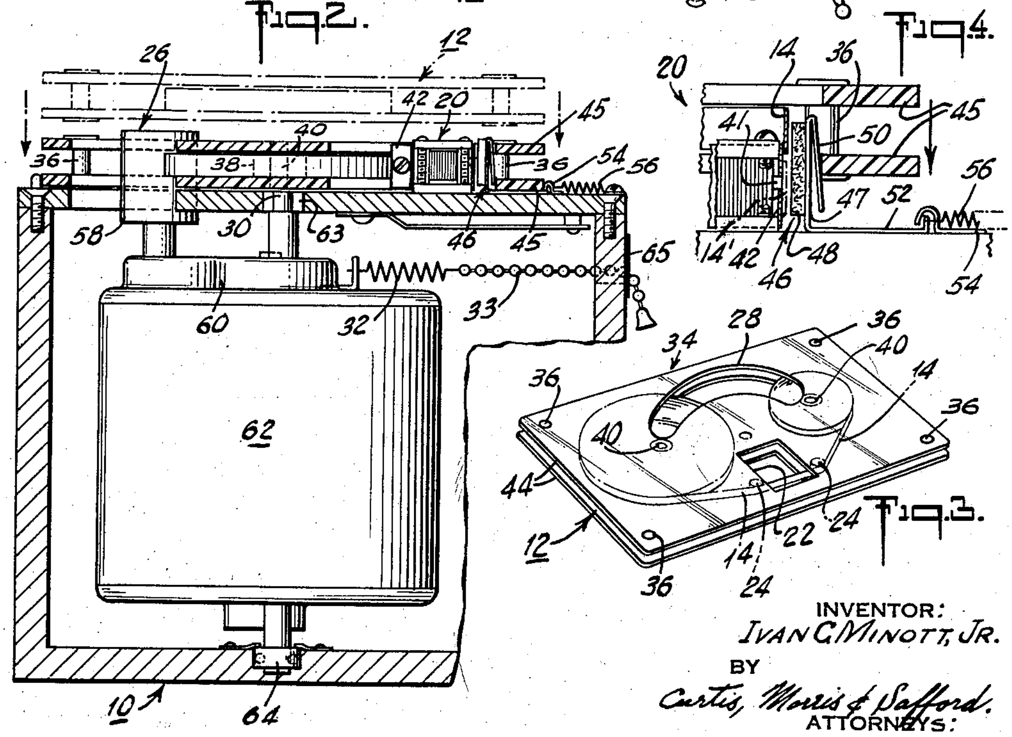
Figure 2 is an end cross-sectional view of the machine and cartridge taken along the line 2—2 in Figure 1 and showing in phantom lines the position of the cartridge immediately before seating on the machine in operative position.
Figure 3 is a perspective view of the cartridge.
Figure 4 is an enlarged partial view taken along the line 2—2 in Figure 1 showing the interaction of the sound head, portions of the cartridge and tape sound carrier.

The frame of cartridge 12 is formed by a pair of identical flat rectangular frame plates 34 which are held parallel, aligned and spaced apart by spacing rods 36 extending between the corners of the plates. The spacing between the plates 34 is made somewhat greater than the width of the sound carrier, as seen in Figure 2, to provide clearance for easy winding of the tape. This clearance may be in the range from $\frac{1}{100}$ to $\frac{1}{8}$ of an inch and preferably is in the range from approximately $\frac{1}{64}$ to $\frac{1}{16}$ of an inch in order to provide an accurate guiding of the tape. The spools 16 have no flanges and the tape is substantially entirely guided by fixed guide surfaces, which in the embodiment shown are provided by the inside surfaces of plates 34, and guided by the two tape guiding rods 24. The inside surfaces of the plates 34 serve to hold the tape in an axial direction on spools. The spools 16 each comprise an annular disk 38 secured to a shaft 40 extending between plates 34 with the ends of each shaft rotatably mounted approximately in the centers of its respective halves of these plates 34. The guide rods 24 aid the spacing rods 36 in holding the plates 34 in properly aligned relationship so that the cartridge can withstand rough handling, for example, in sending through the mails.

In order to provide a smooth winding operation, advantageously the disks 38 and their shafts 40 fit within the cartridge with no significant play and the sides of the disks may lightly touch the inside surface of both plates 34 to prevent axial motion. The tape 14 may be secured at each end to the perimeter of one of the disks by means of a suitable leader of sufficient length to enable the full length of the sound tracks on tape 14 to pass the sound head 20 in either direction.

In the embodiment of my invention described herein the tape 14 is adapted for the magnetic recording and reproducing of sound, and may carry two sound tracks recorded thereon in opposite directions. The sound head 20 contains a magnetic scanning member with aligned pole tips 41, shown in Figure 4, spaced a predetermined distance above the top of the machine to engage either one of the sound tracks on the tape 14, preferably the upper track when the cartridge is seated on the machine, as shown. To aid in shielding the head 20 and provide a smooth face from which the pole tips 41 project, a thin flat strip of metal 42 is stretched across the face of the head between two supporting pins 43. These pins are spaced back a slight distance from the tape-engaging face of head 20 so that the strip 42 presents a slightly convex outer surface. The ends of strip 42 are clamped together in tension at the rear of the head as shown. Pole tips 41 project through a small opening in guide strip 42 to contact the tape 14.

Initially, when the cartridge is loaded onto the machine, the left spool 16 is full, and the roll 25 on the right spool comprises only the initial portion of the leader secured thereto. As the tap is wound into roll 25, the capstan 26 and motor 62 are gradually swung around pivot 30 in a counter clockwise direction as seen in Figure 1. Figure 1 shows the appearance of the cartridge when about one-third of the tape has been wound into roll 25. After the first of the sound tracks has been fully scanned, roll 25 is full, and the left spool 16 is empty except for a few turns of the other leader. In this fully wound condition an abutment 17 on the motor frame strikes and turns off a limit switch 19 which turns off the motor. The operator is warned just prior to closure of switch 19 by a suitable signal or recorded statement that it is time to remove the cartridge, turn it over and place it back on the machine in position corresponding to its initial position with the full spool again on the left. After the cartridge has been placed back on the machine in inverted position, the capstan 26 is swung in against the empty spool. Sound reproduction then continues with the head 20 in operative relationship with the second track which is now in the upper position because of the inversion of the cartridge and with the tape again passing from left to right along its sound transducing path between guides 24.

Among the advantages of this operation is the result obtained that when the second sound track has been fully scanned the tape 14 is fully rewound into its initial position in readiness for the next complete sound reproducing operation, no "rewinding" is required.

The window 22 for the sound head is formed by generally rectangular holes cut in both plates 34 adjacent their long edges 44 opposite from window 28. These holes are spaced a short distance from edges 44 to leave narrow strips 45 extending along the edge of cartridge 12, serving to actuate a slidable tape-backing and guiding member 46 adjacent the tape-engaging face of head 20. This member is generally L-shaped and carries on its vertical leg 47 a resilient pad 48 of material such as felt or the like, extending the full width and height of the face of the head and adapted to be pressed against the back side of the tape 14 when the cartridge is being seated down into place on the machine, as shown in Figure 4. A spring tab 50 extends down and out at an angle from the top of the vertical leg 47 and is engaged by the strips 45 so as to slide the member 46 to the left against the back of the tape 14 to hold it in contact with the pole tips 41. The horizontal leg 52 of member 46 is held on the top of the machine by clamps 54 which permit it to slide toward and away from the head. A small spring 56 holds member 46 spaced away from the head 20 whenever the cartridge is removed from the machine to enable the tape 14 readily to slide down between the pad 48 and the head 20.

The arcuate window 28 is formed by curved slots cut in the cartridge plates 34 arranged to be concentric about the pivot 30 when the cartridge is placed on the machine. These slots have their center lines aligned with the spool shafts 40, so that in effect both of these shafts and window 28 all lie on a single circular arc about the pivot 30, which is the path that the capstan 26 travels as it moves toward and away from the right spool. The capstan 26 has a tape-driving sleeve 58 of resilient material, such as rubber, to provide good frictional engagement with the tape 14 and is driven through a speed-reducing gear drive at 60 from a motor 62. The capstan and gear drive are carried within the top casing of the motor, and the whole motor assembly is swingably carried on the vertical pivot shaft 30 extending between bearings 63 and 64 in the top and bottom of the machine, respectively. The whole assembly is urged in a clockwise direction about pivot 30 by the spring 32 connected between one side of the motor assembly and a force-adjusting control, shown here as a beaded pull-chain 33 pulled through a hole in the front of the machine and held at various positions by a V-shaped notch in a latch plate 65 on the front of the machine. In order to urge the capstan against the empty right spool the control 33 is pulled to tension spring 32 and then held in place by latch plate 65.

Among the important advantages of this apparatus are those arising because the capstan 26 is enabled to be used as the tape-driving element to provide the desired uniform motion of the tape 14 past head 20 and also is used as the driving element to wind the take-up spool. It will be understood that because the capstan 26 is in direct contact with the outside layer of tape 14 in roll 25 it is exerting a direct pull on the tape passing the head 20. Thus, the speed of the tape passing this head is constant depending only upon the speed of the capstan and not affected by the diameter of roll 25.

Moreover, with this arrangement a very smooth accurate reeling operation is obtained with the tape wound into the take-up roll under slight uniform tension. This advantageous reeling operation is obtained because the pad 48 in pressing the tape against the head 20 provides a slight frictional drag, whereby the section of tape between head 20 and the point of tangency of the capstan is maintained under uniform tension. This section of tape under tension includes approximately one-half of a turn of the outside layer in roll 25. This tight outer turn serves to hold the inner layers firmly in place so that the spool cannot turn freely and hence cannot release the inner layers from their smoothly wound condition.

This machine may be used with either of two sound-amplifying systems by means of the jacks 66 and 68 located near the left corner of the top front of the machine. In the first arrangement, the signals from head 20 are fed through shielded wires 70 and 72 past jack 66 to a compact amplifier 74 located within the machine 10. The output signals from the amplifier are fed through shielded wires 76 and 78 past jack 68 to a loud speaker 80 mounted within the end of the machine and communicating with the outside air through several ports, as indicated by the dotted passageways through the end of the casing adjacent to the loudspeaker.

Where greater amplification is desired, the input lead of an external amplifier may be plugged into jack 66, which is arranged to interrupt the circuit 72 into amplifier 74. The same speaker 80 may be used with the external amplifier by plugging the output from the external amplifier into jack 68 which interrupts circuit 76 from amplifier 74 to speaker 80.

I have found that a highly satisfactory cartridge can be made by the use of transparent plastic sheet material to form the plates 34, such as "Plexiglas." The spacing rods 36 for these plates may be formed by clips or rivets having flanges extending adjacent the outside surfaces of plates 34. The shanks of these clips or rivets are inserted into or through hollow cylindrical spacers which abut against the inside faces of the plates 34. The proper spacing of plates 34 is readily obtained merely by cutting all of the cylindrical spacers to the same axial length. Guide rods 24 adjacent window 22 are similarly formed. The ends of the spool shafts 40 may be provided with transverse slots, or the like, as shown in Figure 1 to permit a user to turn one or the other of the disks, as with a screw driver, for example if he wishes to wind back and replay a short length of tape, as may be desirable after an interruption.

The embodiment of my invention described is used for sound reproducing, but it is to be understood that many of the aspects of my invention disclosed herein are equally applicable to sound recording equipment. Accordingly, the phrase "sound transducing" as used herein is intended to encompass both sound recording and reproducing. A magnetic-type apparatus was disclosed with a magnetizable sound carrier, but the phrase sound carrier is intended to include all types of sound recording and reproducing media, for example, such as mechanical, optical, chemical, reluctance, magnetic, etc.

It is important to note that with a cartridge as shown, the apparatus may be used with a relatively large amount of tape for the size of the cartridge. Thus, I have found that the tape may be wound onto either disk until the roll of tape extends out to the nearer guide 24, at which time the other disk is substantially empty. The radius of a full roll is substantially equal to the distance between either shaft 40 and the nearer guide 24, so that the diameter of a full roll may be substantially greater than the size of one half of the cartridge. Therefore, another important advantage of the present invention is that the outside dimensions of the cartridge for any given tape length may be considerably less than the size of two standard reels for handling the same length of tape.

I claim:

1. Sound transducing apparatus adapted to utilize a sound-carrier tape in a cartridge, said apparatus including a tape-driving machine, a sound transducing member in said machine, a driving motor in said machine, a rotable tape-driving capstan coupled to said motor to be driven thereby, said capstan projecting at least partially from said machine and being mounted for lateral movement, and force-exerting means in said machine coupled to said capstan and urging it to move laterally along a predetermined drive path, a cartridge arranged to be held in operative relationship with said machine and to be removed therefrom, a sound-carrier tape in said cartridge, a spool in said cartridge around which said tape is wrapped during sound transducing operation, and a guide for said tape, said tape passing said guide along a predetermined sound transducing path in said cartridge and thereafter being wrapped around said spool, said cartridge having a clearance opening therein adjacent said spool, and at least one cartridge holding element on said machine arranged to hold said cartridge on said machine with said tape guide adjacent said sound transducing member, thereby to hold said sound transducing path of said tape in a predetermined position with respect to said sound transducing member, said cartridge holding element also arranged to hold said cartridge on said machine with said opening aligned with said capstan and with said spool in said drive path, whereby said capstan projects into said cartridge through said clearance opening and is urged against the outer layer of the tape wrapped on said spool, whereby said capstan both drives said tape at constant speed along its transducing path and then smoothly wraps said tape on said spool.

2. Sound transducing apparatus adapted to utilize a sound-carrier tape in a cartridge, said apparatus including a tape-driving machine, a sound transducing member in said machine, a driving motor in said machine, a rotatable tape-driving capstan coupled to said motor to be driven thereby, said capstan projecting at least partially from said machine and being pivotally mounted in said machine for lateral movement along an arcuate drive path and force-exerting means in said machine coupled to said capstan and urging it to move laterally along said drive path, a cartridge arranged to be held in operative relationship with said machine and to be removed therefrom, a sound-carrier tape in said cartridge, in rotatable spool in said cartridge around which said tape is wrapped during sound transducing operation, and a guide for said tape, said tape passing said guide along a predetermined sound transducing path in said cartridge and thereafter being wrapped around said spool, said cartridge having an arcuate clearance opening therein adjacent said spool, the axis of rotation of said spool lying approximately on an extension of the center line of said clearance opening and at least one cartridge holding element on said machine arranged to hold said cartridge on said machine with said tape guide adjacent said sound transducing member, thereby to hold said sound transducing path of said tape in a predetermined position with respect to said sound transducing member, said cartridge holding element also arranged to hold said cartridge on said machine with the centerline of said opening aligned with the arcuate drive path of said capstan, whereby when said cartridge is mounted on said machine, said capstan projects into said cartridge through said clearance opening and is urged against the outer layer of the tape wrapped on said spool to drive said tape at constant speed along its transducing path and then smoothly wrap said tape on said spool.

3. Apparatus as claimed in claim 2 and wherein said machine includes a tape support adapted to contact the surface of said tape opposite to said sound transducing member, said tape support being movable toward and away from said member, spring means biasing said support away from said member, and an abutment in said cartridge arranged to engage said support to move it toward said member to support said tape as said cartridge is loaded onto said machine.

4. An invertible cartridge for housing a length of magnetic sound recording tape comprising a pair of spaced, parallel, aligned plates, a plurality of supports extending between said plates, a pair of coplanar reels rotatably mounted between said plates and defining substantially cylindrical surfaces upon which to wind the tape, one end of the tape being wound on each reel with an intermediate portion of the tape extending therebetween, and a pair of spaced tape-directing elements between said plates and engaging said intermediate tape portion to guide it along a pre-determined scanning path between said plates, each of said plates having a scanning window therein aligned with the tape in said scanning path between said tape-directing elements, the inner opposed surfaces of said plates adjacent said reels being spaced apart slightly more than the width of said tape to provide guide surfaces to align the tape axially on said reels while being wound thereon, and each of said plates having an arcuate slot therein extending from one reel to the other.

References Cited in the file of this patent

UNITED STATES PATENTS

| | | |
|---|---|---|
| 2,441,679 | Wade | May 18, 1948 |
| 2,584,733 | Owens | Feb. 15, 1952 |
| 2,609,457 | Thurm | Sept. 2, 1952 |
| 2,681,950 | Owens | June 22, 1954 |
| 2,702,834 | Golle et al. | Feb. 22, 1955 |
| 2,732,437 | Travis | Jan. 24, 1956 |
| 2,733,069 | Frost et al. | Jan. 31, 1956 |
| 2,745,604 | Masterson | May 15, 1956 |
| 2,778,637 | Eash | Jan. 22, 1957 |

FOREIGN PATENTS

| | | |
|---|---|---|
| 706,197 | France | Mar. 24, 1931 |
| 1,055,028 | France | Feb. 16, 1954 |